Jan. 26, 1965   J. KÜHLMANN   3,167,052
AUTOMATIC EGG AND LITTER COLLECTING DEVICE
FOR POULTRY BATTERY CAGES
Filed Oct. 2, 1962   3 Sheets-Sheet 3
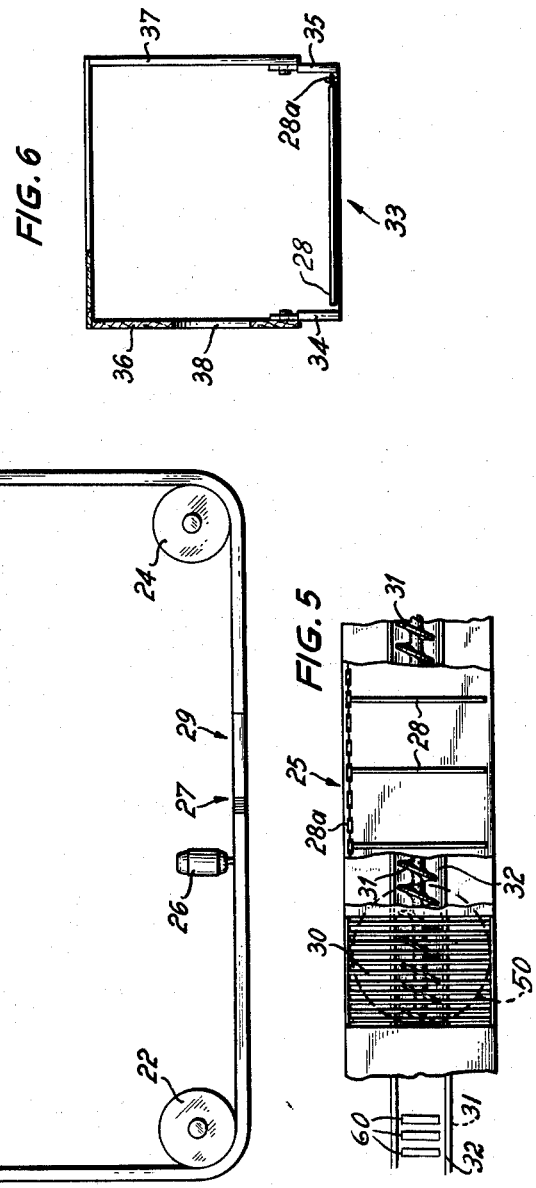
INVENTOR
Josef Kühlmann

United States Patent Office 3,167,052
Patented Jan. 26, 1965

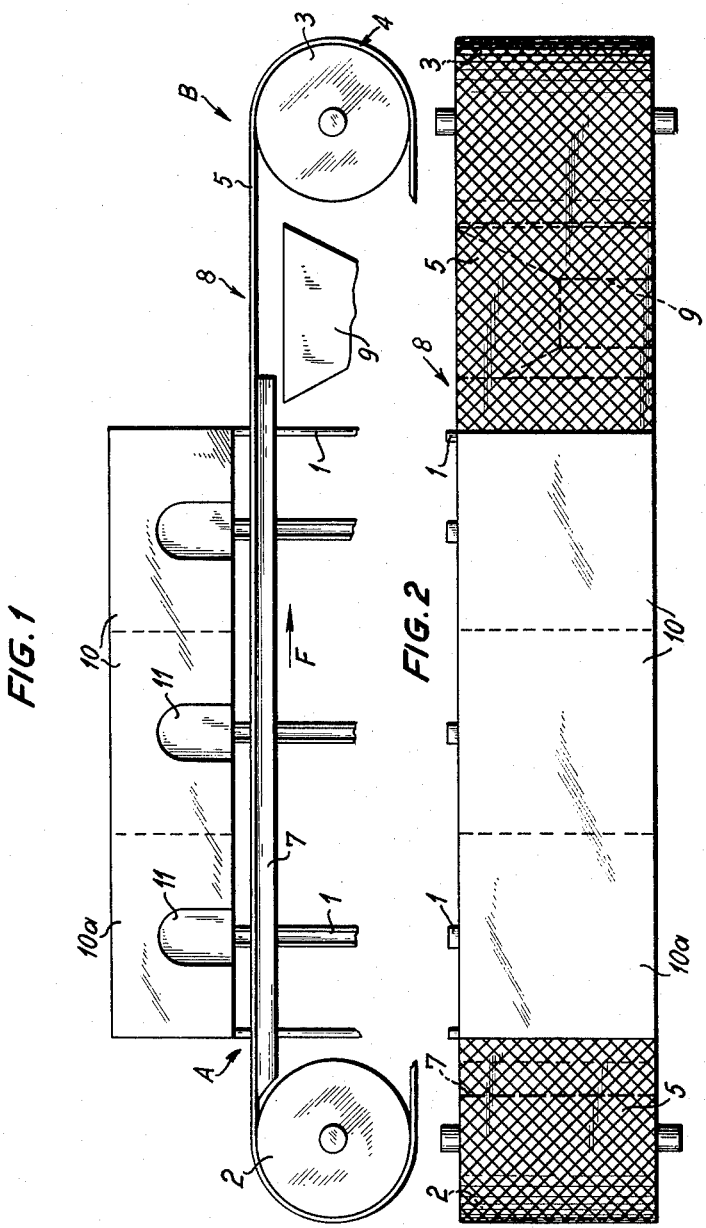

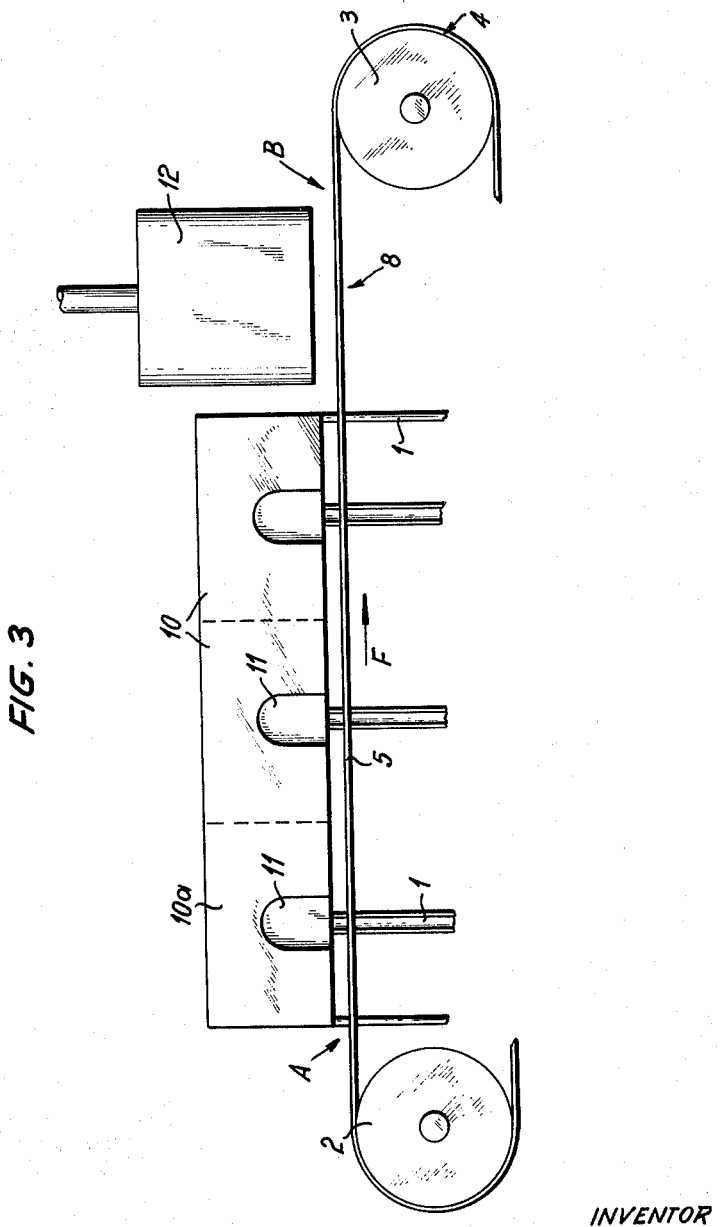

3,167,052
AUTOMATIC EGG AND LITTER COLLECTING
DEVICE FOR POULTRY BATTERY CAGES
Josef Kühlmann, Alst 25, Horstmar,
Kreis Steinfurt, Germany
Filed Oct. 2, 1962, Ser. No. 227,912
Claims priority, application Germany, Oct. 7, 1961,
K 39,401; Feb. 6, 1962, K 45,833
4 Claims. (Cl. 119—45)

This invention relates to an automatic collector of eggs. Collectors are used in husbandry systems for poultry. They are convenient not only for collecting purposes but also for rapid conveyance of the eggs to receiving means.

It is known in the art to use automatic nests, comprising a boxlike compartment, the bottom of which is covered with a felt or the like; said bottom being provided with a hinged cover or a chute.

In case the hen lays an egg on the hinged cover the cover will be swung downwardly by weight of the egg. Thereupon the egg will be transferred to a collecting means, for instance a conveyor belt. The eggs will either be conveyed intermittently or continuously to a place where the eggs are gathered. The collecting of the eggs is similarly accomplished when a chute is employed.

The known collectors have the following disadvantages: The covering material, for instance felt, gets dirty very soon. Therefore the eggs that have to be sold must be cleaned before delivery. Since egg-cleaning has to be done by hand, this requires much time and expense.

It is an object of the present invention to improve the described collectors by installing a multitude of boxlike compartments, or poultry enclosures, and arranging them over the larger length of a conveyor belt and somewhat above it. The compartments are open at the bottom. In the front wall of each compartment an inlet port is provided for the poultry. That part of the conveyor which is not provided with compartments is furnished with means for separating litter, such as sawdust, from the eggs and for conveying the eggs which are coated with litter to a gathering means.

According to a first embodiment of the invention a wire mesh-like or a grid-like conveying belt is installed, the upper run of which is guided over a litter support forming one integral and imperforate surface.

Litter is deposited on the wire mesh-like or grid-like conveyor according to the first embodiment of the invention. The layer of litter is established where the belt lies on the support. The layer is as high as is needed for providing a suitable nest. The conveyor belt covered with litter is brought beneath the boxlike compartments. The litter covered conveyor belt forms a bottom for each of the compartments.

The hens lay their eggs on the litter. In accordance with the number of hens the conveying belt is intermittently advanced relative to the compartments once or twice a day. After the belt is advanced relative to the compartments, the part of the belt being covered with litter is moved above a classifying area of the conveyor. This part of the conveyor is adapted for separating eggs and litter. In this area the conveyor belt is not underlain by the aforementioned plate-like litter support. The litter falls down through the holes of the belt. Since these holes are smaller than the diameter of the eggs, the eggs remain on the surface of the belt. The eggs can easily be taken from the belt or the eggs can be conveyed to a gathering station at the end of the conveyor near the reverse pulley of the belt.

The litter passing through the holes of the belt is received in a chute or a container which is arranged between the upper and lower strands of the belt. The litter can then be brought to the start of the upper strand. The circulating of the litter can be accomplished by conveying means such as blowers or other means.

It is another feature of the invention to dispose pulleys in different distances to a horizontal plane. Thereby vibrations of the belt are occasioned in the classifying area of the upper run. By this the discharge of litter is improved. It is within the scope of the invention to install an additional vibration device.

The belt may be made of mesh wire or of rubber or resin. In any case the holes of the belt have to be smaller than the diameters of the eggs.

According to another feature of the invention the belt may be formed with a plain holeless surface. Suction means are provided above the classification area of the belt for discharging the litter. It is even possible to convey the eggs mixed with litter both being on the upper run to the lower run in order to carry them beneath containers arranged above the lower drum. By this a better classification is attained.

According to another embodiment of the invention a chain conveyor is used with laterally projecting pins. This chain conveyor travels through a boxlike trough, the lateral walls of which being provided with means for inserting front and rearwalls of the compartments, forming a battery or assembly of prefabricated parts. According to the surroundings of collecting plant the front walk with the entrance to the partitions may be opposite the interior of the poultry house or opposite the poultry yard.

The intermediate walls of the compartment battery may be arranged free to swing in a forward direction around the upper edge of the same. The belt can thus be moved without hurting the hens sitting on the moving belt.

Beneath the classifying area the litter passing through the holes of the belt may be conveyed by a screw conveyor arranged in a trough, to a drying plant and back again to the belt conveyor. A continuous operation can be achieved even if the litter has become wet due to bad weather conditions.

Other objects and advantages of the present invention will be more readily ascertained from an inspection of the following specification taken in connection with the accompanying drawings wherein like numerals refer to like parts throughout, while the features of novelty will be more distinctly pointed out in the appended claims.

In the drawings,

FIGURE 1 is a side elevation.

FIGURE 2 is a plan view partly in section according to FIGURE 1.

FIGURE 3 is a side elevation of another embodiment of the invention.

FIGURE 4 is a plan view of another embodiment of the invention.

FIGURE 5 is an enlarged fragmentary plan view of the embodiment according to FIGURE 4.

FIGURE 6 is a cross section of a conveying trough taken along 6—6 of FIG. 4.

Referring now more specifically to FIGURE 1 a frame 1 is shown with two belt drums 2 and 3. One or both of the drums can be driven for instance by an electric motor. The upper run of the belt is designated by reference number 5. Just beneath run 5 a plate 7 is arranged along one part of the same. Litter on the upper run 5 is supported by said plate 7. Referring to FIGURE 2 the belt 4 is a wire mesh-like or grid-like structure. On the other hand plate 7 is one uninterrupted integral part without holes. That part of the belt not supported by plate 7 is in the classifying area, designated by numeral 8 in FIGURES 1 through 3. FIGURES 1 and 2 show a container or chute 9, arranged beneath part 8 of the conveying belt.

Above the upper run 5 boxlike hen compartments are arranged, the first of which—relative to the forward direction F of the belt—being designated by 10a. The battery of compartments may have any suitable number of compartment according to the desired size poultry farm. The front wall of every compartment is provided with an entrance 11. The battery of compartments is installed at a certain distance above run 5. By this it is possible to deposit litter at point A (FIGURES 1 and 3) on the belt, which is conveyed beneath the compartments.

The operation is as follows:

A layer of litter is formed on the upper run having a thickness about the same as the distance between the compartments and belt. The belt 5 is moved in the direction of arrow F. Whereby the layer of litter is conveyed under the compartments 10. Hens lay eggs on this layer. For example, once or twice a day the eggs are conveyed by moving the belt 5 in the direction of arrow F. The belt 5 may be moved in accordance with the amount of eggs deposited; for example, several times a day intermittently.

During conveyance the litter reaches area 8 of belt 5, which is beyond the downstream end of imperforate plate 7. The belt being made of wire mesh or grid has holes therethrough. The litter is discharged through these holes and falls into the container 9.

Since the holes of the belt are of a smaller diameter than the eggs, only the litter can pass through the mesh screen while the eggs remain on the belt. The eggs are discharged at B. Gathering means may be installed at B.

The material received in container or chute 9 can either be transported by a conveyor or other transport means to A or can be taken out of the system.

Since it is possible to always use a new layer of litter the eggs will not get dirty. The eggs therefore reach the discharge point B in a clean condition. Incidental dirt on the eggs will be absorbed by the litter.

Referring to FIGURE 3 a suction device 12 is installed in top of area 8 of the egg collecting region. This suction device is adapted for suction removal of the litter. Thereby litter and eggs are separated. In this embodiment of the invention the belt 5 is made of a solid material without any holes. The suction device 12 conveys the litter back to point A of the system or delivers it to gathering station for litter.

Referring to FIGURE 4, four guide pulleys designated 21, 22, 23, 24 guide a conveying means 25 along a closed path which may be circular path or a rectangular path as shown. A driving means 26, installed at a suitable place on conveyor 25, has a gear and transmission and is adapted to move the conveyor. The driving connection may be made by meshing a member of the gear with the chain-like conveyor in the well known way. 27 designates a point where the trough of the conveyor is fitted with a grid 30 (see FIG. 5). The litter can pass through this grid. On the other hand the members of grid 30 have a distance from each other so as to prevent the eggs from falling through. Referring to FIGURE 5, the eggs are conveyed by the pins 28 of the chain conveyor 28a. The eggs are transported to point 29 (see FIGURE 4). The eggs may be gathered by hand at point 29. Beneath area 30 of the conveyor a screw conveyor 31 is mounted in a trough 32. Said screw conveyor receives the litter from area 30 and conveys the same to the charge point A.

Beneath grid 30 a funnel 50 may be arranged, if desired, for guiding the litter to the trough 32 of the screw conveyor 31. The trough 32 may be furnished with drying units; for instance, with electrically heated pins 60, lamps etc. The litter is thus dried on its travel from the grid area 30 to the charging area of the belt. In FIG. 5, the electrically heated pins 60 may be arranged in the trough 32 underneath, or above, the screw conveyor 31.

The arrangement of the front and side walls of the compartment can be seen on FIGURE 6. The trough 33 is provided with lateral walls 34, 35. The rear wall 37 and the front wall 36 can be inserted into the lateral walls 34, 35. Front wall 36 is provided with the entrance 38 for the hens. It is possible to attach the front wall to each of the lateral walls 34, 35 and thereby to make the compartments accessible from each of both sides especially from that side which is according to local circumstances most advantageous.

The entire conveyor consists of a multitude of compartments, which can be assembled with prefabricated parts. Thereby the conveyor can be enlarged or reduced according to seasonal conditions without applying constructions and mounting-work.

It is possible to arrange the path of the conveyor both in a circle and also vertically at different heights. For instance the conveyor can be placed on the bottom of one part of the poultry house and can then be guided to the seating bars of the poultry. Thereby the different parts of the house can be served according to the local circumstances.

It will further be apparent that many modifications and variations, other than those pointed out above, may be made in the device of the present invention by anyone skilled in the art in accordance with the principles hereinabove set forth without the use of any inventive ingenuity. I desire, therefore, to be protected for any and all such modifications and variations that may be made within the spirit of the present invention and the scope of the claims hereto appended.

What I claim is:

1. In combination with a horizontally arranged series of poultry enclosures, each including an entrance port for live poultry and an open bottom, means for automatically collecting eggs deposited by the poultry in the enclosures comprising: conveyor means, including an endless conveyor having a horizontal run arranged at a fixed distance below said series of enclosures and spaced from the open bottoms thereof for receiving a layer of litter for transport to a position beneath said enclosures to form bottoms for said enclosures; said endless conveyor including conveyor elements spaced apart sufficiently for falling of litter through said container but being close enough to prevent eggs from falling therethrough; means selectively operable to advance said container in a downstream direction to remove litter and deposited eggs from beneath said enclosures for transport of eggs to an egg removal location, and to transport a fresh layer of litter to a location beneath said enclosures; and a horizontally extending imperforate litter support positioned immediately beneath said horizontal endless conveyor run and extending from a point upstream of said enclosures to at least the downstream end thereof, to prevent that portion of the litter layer which is beneath said enclosures and upstream thereof falling through said conveyor; said litter support terminating upstream of said egg removal location to provide for falling of litter through said conveyor in advance of said egg removal location; said conveyor means being constructed and arranged to retain eggs on said endless conveyor against falling therethrough while providing for the removal of used litter.

2. The combination, according to claim 1, in which said conveyor means consists of said endless conveyor, said endless conveyor being reticulated and having openings sufficiently large to provide for litter to fall therethrough and sufficiently small to prevent eggs falling therethrough.

3. The combination, according to claim 1, in which conveyor means comprises an endless trough having laterally spaced side walls and a horizontal bottom wall extending laterally between said side walls; said bottom wall constituting said horizontally extending imperforate litter support; said endless conveyor extending along and within said trough, and including horizontal conveyor elements extending transversely of said trough between said side walls and spaced longitudinally of said endless conveyor distances sufficient for litter to pass therethrough; said trough bottom wall being imperforate except at a litter discharge location downstream of the downstream end of said enclosures; said trough bottom wall being interrupted at said litter discharge location; a grating disposed beneath said trough at the interrupted portion of said bottom wall and having spaces between elements thereof sufficiently large for litter to pass elements thereof sufficiently large for litter to pass therethrough and sufficiently small to prevent eggs passing therethrough; and litter receiving means located beneath said grating to receive litter swept along by said endless conveyor to the interrupted portion of said trough bottom wall and falling through the spaces of said grating.

4. The combination according to claim 3, wherein said endless conveyor comprises an endless chain extending along one side wall of said trough; said conveyor elements comprising arm members connected to said chain and extending therefrom across said trough to the other side wall thereof.

References Cited by the Examiner

UNITED STATES PATENTS

| 2,096,356 | 10/37 | Fox | 119—18 |
| 2,186,120 | 1/40 | Oser | 119—22 |
| 2,271,170 | 1/42 | Danker | 119—22 |
| 2,302,314 | 11/42 | Haggart | 119—18 |
| 2,589,228 | 3/52 | Cordis | 119—22 |
| 2,591,609 | 4/52 | Roberts et al. | 119—52 |
| 2,604,874 | 7/52 | Forbes et al. | 119—21 |
| 2,675,783 | 4/54 | Sears | 119—82 |
| 2,794,576 | 6/57 | Reynolds | 119—53 |
| 3,071,109 | 1/63 | Pierre | 119—22 |

FOREIGN PATENTS 209,832   1/24   Great Britain.

SAMUEL KOREN, *Primary Examiner.*

ALDRICH F. MEDBERY, *Examiner.*